United States Patent
Dutta et al.

(10) Patent No.: US 11,481,117 B2
(45) Date of Patent: Oct. 25, 2022

(54) STORAGE VOLUME CLUSTERING BASED ON WORKLOAD FINGERPRINTS

(71) Applicant: Hewlett Packard Enterprise Development LP, Houston, TX (US)

(72) Inventors: Mayukh Dutta, Bangalore Karmataka (IN); Manoj Srivatsav, Bangalore Karnataka (IN); Gautham Parameshwar Hegde, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/861,575

(22) Filed: Apr. 29, 2020

(65) Prior Publication Data
US 2020/0393971 A1   Dec. 17, 2020

(30) Foreign Application Priority Data
Jun. 17, 2019  (IN) .............................. 201941024015

(51) Int. Cl.
*G06F 3/06* (2006.01)
*G06K 9/62* (2022.01)
(Continued)

(52) U.S. Cl.
CPC ............ *G06F 3/0611* (2013.01); *G06F 3/067* (2013.01); *G06F 3/0647* (2013.01); *G06F 3/0653* (2013.01); *G06F 3/0659* (2013.01); *G06F 11/3006* (2013.01); *G06F 11/3034* (2013.01); *G06F 11/3419* (2013.01); *G06K 9/6218* (2013.01)

(58) Field of Classification Search
CPC .... G06F 3/0611; G06F 3/0647; G06F 3/0653; G06F 3/0659; G06F 3/067; G06F 11/3006; G06F 11/3034; G06F 11/3419; G06K 9/6218
See application file for complete search history.

(56) References Cited

U.S. PATENT DOCUMENTS 8,190,939 B2   5/2012 Fields, Jr. et al.
8,578,023 B2   11/2013 Satterfield et al.
(Continued)

FOREIGN PATENT DOCUMENTS

WO   2017/105376 A1   6/2017

OTHER PUBLICATIONS

Zhang, R. et al., "IO Tetris: Deep Storage Consolidation for the Cloud via Fine-grained Workload Analysis", Proceedings—2011 IEEE 4th International Conference on Cloud Computing, Aug. 2011, 8 pages.
(Continued)

*Primary Examiner* — Eric T Oberly

(57) ABSTRACT

In some examples, a system assigns workload fingerprints to each respective storage volume of a plurality of storage volumes, the workload fingerprints assigned to the respective storage volume across a plurality of points. Based on the workload fingerprints assigned to respective storage volumes of the plurality of storage volumes, the system groups the storage volumes into clusters of storage volumes. The system manages an individual cluster of the clusters of storage volumes according to an attribute associated with the individual cluster.

20 Claims, 6 Drawing Sheets

(51) Int. Cl.
*G06F 11/30* (2006.01)
*G06F 11/34* (2006.01)

(56) References Cited

U.S. PATENT DOCUMENTS

| | | | |
|---|---|---|---|
| 8,832,330 | B1 | 9/2014 | Lancaster |
| 8,856,335 | B1 | 10/2014 | Yadwadkar et al. |
| 8,935,500 | B1 | 1/2015 | Gulati et al. |
| 9,104,572 | B1 | 8/2015 | Thompson et al. |
| 9,135,191 | B1 | 9/2015 | Dighe et al. |
| 9,489,138 | B1 | 11/2016 | Kumar et al. |
| 9,575,828 | B2 | 2/2017 | Agarwal et al. |
| 9,594,515 | B2 | 3/2017 | Hrischuk et al. |
| 9,628,499 | B1 | 4/2017 | Yu et al. |
| 9,703,664 | B1 | 7/2017 | Alshawabkeh et al. |
| 9,753,833 | B2 | 9/2017 | Magdon-Ismail et al. |
| 9,753,987 | B1 | 9/2017 | Dolan et al. |
| 9,772,794 | B2 | 9/2017 | Li et al. |
| 10,025,813 | B1 | 7/2018 | Gebremariam et al. |
| 10,200,461 | B2 | 2/2019 | Tino |
| 10,778,552 | B2 | 9/2020 | Dutta et al. |
| 10,884,636 | B1 * | 1/2021 | Abrol ............ G06F 3/061 |
| 11,070,455 | B2 | 7/2021 | Dutta et al. |
| 2008/0034148 | A1 | 2/2008 | Gower et al. |
| 2009/0106602 | A1 | 4/2009 | Piszczek et al. |
| 2011/0072208 | A1 | 3/2011 | Gulati et al. |
| 2011/0208941 | A1 * | 8/2011 | Gill ............ G06F 3/0631 711/170 |
| 2014/0208156 | A1 | 7/2014 | Muralimanohar et al. |
| 2014/0244643 | A1 | 8/2014 | Basak et al. |
| 2015/0007173 | A1 | 1/2015 | Ionescu et al. |
| 2015/0066470 | A1 | 3/2015 | Chopra et al. |
| 2015/0199148 | A1 * | 7/2015 | Hrischuk ............ G06F 3/0653 711/114 |
| 2016/0004475 | A1 | 1/2016 | Beniyama et al. |
| 2016/0165462 | A1 | 6/2016 | Tan et al. |
| 2016/0291876 | A1 * | 10/2016 | Alatorre ............ G06F 3/0644 |
| 2016/0357443 | A1 | 12/2016 | Li et al. |
| 2016/0359592 | A1 | 12/2016 | Kulshreshtha et al. |
| 2016/0359872 | A1 | 12/2016 | Yadav et al. |
| 2017/0017537 | A1 | 1/2017 | Razin et al. |
| 2017/0053011 | A1 * | 2/2017 | Alatorre ............ G06F 16/252 |
| 2017/0060769 | A1 | 3/2017 | Wires et al. |
| 2017/0093667 | A1 | 3/2017 | Thirumoorthy et al. |
| 2017/0206107 | A1 | 7/2017 | Guha |
| 2017/0269854 | A1 | 9/2017 | Dimnaku et al. |
| 2017/0329660 | A1 | 11/2017 | Salunke et al. |
| 2017/0371558 | A1 | 12/2017 | George et al. |
| 2018/0006903 | A1 * | 1/2018 | Ganguli ............ H04L 41/5009 |
| 2018/0027060 | A1 | 1/2018 | Metsch et al. |
| 2018/0081832 | A1 * | 3/2018 | Longo ............ G06F 11/3433 |
| 2018/0113640 | A1 * | 4/2018 | Fernandez ............ G06F 3/061 |
| 2018/0123931 | A1 | 5/2018 | Sun et al. |
| 2019/0065261 | A1 * | 2/2019 | Narayan ............ G06F 1/20 |
| 2019/0087248 | A1 | 3/2019 | Pendar et al. |
| 2019/0124099 | A1 | 4/2019 | Matselyukh |
| 2019/0163553 | A1 | 5/2019 | Ramegowda et al. |
| 2019/0179679 | A1 * | 6/2019 | Dimnaku ............ G06F 9/4806 |
| 2019/0236149 | A1 | 8/2019 | Kuruvada et al. |
| 2019/0294476 | A1 | 9/2019 | Yadhav et al. |
| 2019/0334786 | A1 | 10/2019 | Dutta et al. |
| 2020/0042392 | A1 * | 2/2020 | Alluboyina ............ G06F 9/5033 |
| 2020/0104233 | A1 | 4/2020 | Gaber et al. |

OTHER PUBLICATIONS

Cory, Maklin, "Gaussian Mixture Models Clustering Algorithm Explained", available online at <https://towardsdatascience.com/gaussian-mixture-models-d13a5e915c8e>, Jul. 15, 2019, 20 pages.

Ester et al., "A Density-Based Algorithm for Discovering Clusters in Large Spatial Databases with Noise", Proceedings of 2nd International Conference on Knowledge Discovery and Data Mining (KDD-96), 1996, 6 pages.

Gregg, B. D., "Latency Heat Maps", (Web Page), available online at <http://www.brendangregg.com/HeatMaps/latency.html>, Dec. 18, 2017, 5 pages.

Gregg, B., "Detecting Outliers," (Research Paper), Jul. 1, 2013, 10 pages.

Gulati et al., "PARDA: Proportional Allocation of Resources for Distributed Storage Access," (Research Paper), 7th USENIX Conference on File and Storage Technologies, vol. 9, Jun. 1, 2009, pp. 85-98.

Juan Novella, "Introducing PURE1 Meta: Pure'S AI Platform To Enable Self-Driving Storage", available online at <https://blog.purestorage.com/introducing-pure1-meta-pures-ai-platform-enable-self-driving-storage/>, Jun. 13, 2017, 11 pages.

Mark Cox, "Pure Storage leverages Internet of Things with new Pure1 META AI platform," available online at <<http://www.channelbuzz.ca/2017/06/pure-storage-leverages-internet-things-new-pure1-meta-ai-platform-21774/>, Jun. 14, 2017, 6 pages.

Netapp, Inc., "Workflow Guide for Managing Cluster Performance," (Research Paper), Jun. 2017, 138 pages.

Pure Storage, "Machine Learning with Pure1 Meta," Nov. 16, 2017, transcript of video content, accessed and Ttranscribed Apr. 19, 2018, <https://www.youtube.com/watch?v=n7R4l400dLE>.

Pure Storage, "Pure1: Cloud-Based Management, Analytics, and Support," 2016, 5 pages.

Soni, Azad, "Clustering with Gaussian Mixture Model", Medium, available online at Khttps://medium.com/clustering-with-gaussian-mixture-model/clustering-with-gaussian-mixture-model-c695b6cd60da>, Dec. 5, 2017, 5 pages.

Wikipedia, "Dbscan," available online at <https://en.wikipedia.org/w/index.php?title=DBSCAN&oldid=898794408#cite_note-dbscan-1>, May 25, 2019,4 pages.

Woo, Ben, "The Pure Storage Vision: Orange Is Still The New Black", available online at Khttp://www.neuralytix.com/doc/10414>, Jul. 10, 2017, 9 pages.

David E. Y. Sarna, "Forecasting computer resource utilization using key volume indicators," 1979 International Workshop on Managing Requirements Knowledge (MARK), 1979, pp. 185-192.

Magalhaes, D. M. V., "Workload Modeling and Prediction for Resources Provisioning in Cloud," (Research Paper), 2017, <https://repositorio.ufc.br/bitstream/riufc/22987/1/2017_tese_dmvmagalh%C3%A3es.pdf>.

Mozafari et al., "Performance and resource modeling in highly-concurrent OLTP workloads," (Research Paper), 2013, ACM, Proceedings of the 2013 acm sigmod international conference on management of data, pp. 301-312.

Raza, B., "Self-prediction of Performance Metrics for DBMS Workload," (Research Paper), Feb. 2014, Diss. International Islamic University, Islamabad, Pakistan, <https://www.researchgate.net/profile/Abdul-Mateen-4/publication/271302697_Self-Prediction_of_Performance_Metrics_for_the_Database_Management_System_Workload/links/54e83b570cf217aa4d4fcdc1/Self-Prediction-of-Performance-Metrics-for-the-Database-Management-System-Workload>.

* cited by examiner

STORAGE VOLUME CLUSTERING BASED ON WORKLOAD FINGERPRINTS

BACKGROUND

An arrangement of storage devices can be used to store data. In some examples, data storage by the arrangement of storage devices can be partitioned into storage volumes. A "storage volume" can refer to a logical unit of storage (e.g., a virtual volume having a virtual address range) to which storage locations in physical storage (e.g., storage device(s) in storage array(s), or portions thereof) may be allocated for storage of a collection of data, and that can be managed as a unit.

BRIEF DESCRIPTION OF THE DRAWINGS

Some implementations of the present disclosure are described with respect to the following figures.

Figure 1:
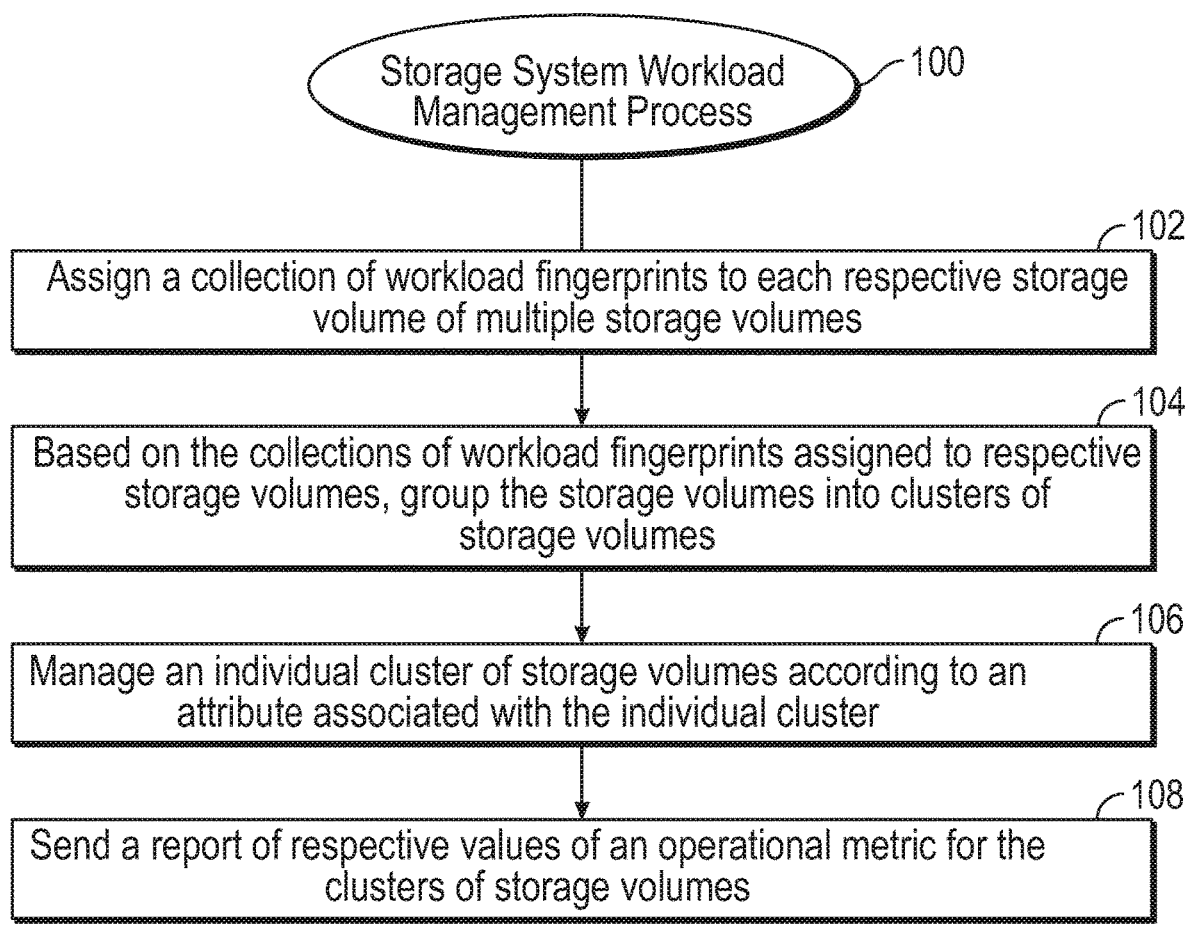
FIG. 1 is a flow diagram of a storage system workload management process according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Storage system performance and/or usage can be expressed using a number of operational metrics. The operational metrics can include usage metrics, which represent usage of the storage system, and/or performance metrics, which represent how well the storage system is performing. Examples of operational metrics include any or some combination of the following: an input/output (I/O) count (that counts a number of I/O requests such as read and write requests), a ratio of read requests to write requests, a cache hit percentage (a percentage of requests that can be satisfied from a cache memory), processor usage, processor saturation (that indicates an amount of a processor that is consumed due to usage of the processor by workloads), cache saturation (that indicates an amount of a cache that is consumed due to usage of the cache by workloads), persistent storage saturation (that indicates an amount of a persistent storage that is consumed due to usage of the persistent storage by workloads), port saturation (that indicates a bandwidth of a port that is consumed due to usage of the port by workloads), queue depth (an amount of a queue storing data), a size of an I/O operation, a measure of a processor being busy, and so forth.

Operational metrics are based on workload patterns of a storage system (or multiple storage systems). A workload pattern refers to a collection of activities associated with accessing (read access and/or write access of) the storage system(s). A "storage system" can refer to a platform including hardware and machine-readable instructions to implement storage of data. A storage system can be implemented using a combination of processing resources, storage resources, and communication resources. A storage system can also include or have access to a storage device (or multiple storage devices). A "storage device" can include persistent storage implemented using nonvolatile storage device(s), such as disk-based storage device(s) (e.g., hard disk drive(s) (HDD(s)), or the like), solid state storage device(s) (e.g., solid state drive(s) (SSD(s)), or the like), and so forth.

In some examples, workload patterns may be observed for respective storage volumes provided by the storage system(s). As described above, a storage volume is a logical unit of storage (e.g., a virtual volume having a virtual address range) to which storage locations in physical storage (e.g., storage device(s) in storage array(s), or portions thereof) may be allocated for storage of data. Storage volumes can be presented to host system(s) that can read and write data of the storage volumes. For example, a storage volume can be exported by a storage system to a host system, for use by the host system. More generally, a storage volume can be made available to the host system so that the host system can access data in the storage volume.

A "host system" can refer to a platform that includes hardware and machine-readable instructions and that is capable of issuing requests to access (read access and/or write access) data of storage volumes. For example, an application program (which is an example of machine-readable instructions) can run in a host system and issue read and write requests for data of storage volume(s).

The workloads for an individual storage volume can be based on requests submitted to the individual storage volume by a requester or by multiple requesters (e.g., application programs in host systems or other types of requesters). Workloads for the individual storage volume can change over time. For example, workloads experienced by the individual storage volume at different times may be due to requests from different combinations of requesters that have different workload profiles that characterize respective behaviors of the requesters with respect to data access patterns of data in storage volumes. Some requesters may be characterized by a first workload profile that indicates that such requesters write large streams of consecutive data to a storage volume. Other requesters may be characterized by a second workload profile that indicates that such other requesters write smaller collections of data to a storage volume. Further requesters may be characterized by other workload profiles.

In the presence of multiple workloads from requesters having different workload profiles executed with respect to individual storage volumes, the resultant workload observed by an individual storage volume is based on a blending of the multiple workloads. The resultant workload of accessing data of a storage volume is performed using resources of a storage system, including processing resources, storage resources, and communication resources. Processing resources of a storage system can include a processor (or multiple processors), or portion(s) of processor(s). Storage resources can include cache memories and persistent storage. Communication resources can include network ports, communication paths, and so forth.

As a result of the blending effect of workloads from different requesters as observed by a storage volume, it may be difficult for a resource management system to manage resources allocated to corresponding storage volumes. Allocating resources to a storage volume can refer to making available the allocated resources for handling read and write requests of data in the storage volume. If an insufficient amount of resources (including processing resources, storage resources, and/or communication resources) is allocated to a storage volume, then performance in accessing data of the storage volume may suffer (e.g., a high latency can be experienced by requesters).

If an excessive amount of resources is allocated to a storage volume, then inefficient usage of resources may result when storing data in the storage volume. For example, the excess resources allocated to one storage volume may not be available for use when accessing another storage volume.

In accordance with some implementations of the present disclosure, as shown in FIG. 1, a storage system workload management process 100 assigns (at 102) a collection of workload fingerprints to each respective storage volume of multiple storage volumes. Workload fingerprints assigned to a storage volume can include workload fingerprints across multiple points (e.g., time points, spatial points, etc.). For example, the workload fingerprints assigned to the storage volume can include a first workload fingerprint at a first time point, a second workload fingerprint at a second time point, and so forth.

A "workload fingerprint" can refer to any representation of a type of a workload, and is assigned based on a sample of operational metrics collected at a given point (e.g., time point, spatial point, etc.). A "time point" can refer to a time duration, such as a 5-second interval, a 100-millisecond interval, and so forth. A "spatial point" can refer to a spatial region, such as a geographical region, a location within a datacenter, etc. The representation of the type of the workload can include a numeric value, a character string, or any other information.

Based on the collections of workload fingerprints assigned to respective storage volumes, the storage system workload management process 100 groups (at 104) the storage volumes into clusters of storage volumes. For example, a first storage volume and a second storage volume are grouped into a given cluster based on a first collection of workload fingerprints assigned to the first storage volume, and a second collection of workload fingerprints assigned to the second storage volume. The grouping of storage volumes into clusters can use any of various clustering techniques, as explained further below.

The storage system workload management process 100 manages (at 106) an individual cluster of storage volumes according to an attribute associated with the individual cluster. An "attribute" can refer to an individual operational metric, a collection of operational metrics, or a measure derived from operational metric(s) of the individual storage volume. Managing the individual cluster of storage volumes can include any or some combination of the following: throttling the workloads of the cluster of storage volumes (such as by reducing a rate at which data requests are submitted in a storage system for data of the cluster of storage volumes), configuring a quality of service setting for the storage volume, changing an allocation of resources to the cluster of storage volumes (such as by changing an amount of resources allocated to handle data accesses of the data of the cluster of storage volumes), migrating data of the cluster of storage volumes from a first set of storage devices to a different second set of storage devices, and so forth.

Managing the individual cluster of storage volumes according to the attribute can refer to performing a management action (e.g., workload throttling, resource allocation adjustment, data migration, etc.) based on an observed value of the attribute.

The storage system workload management process 100 can also send (at 108) a report of respective values of an operational metric for the clusters of storage volumes (explained further below). Additionally, the storage system workload management process 100 can also identify and report outliers within a cluster of storage volumes (also explained further below).

Figure 2:
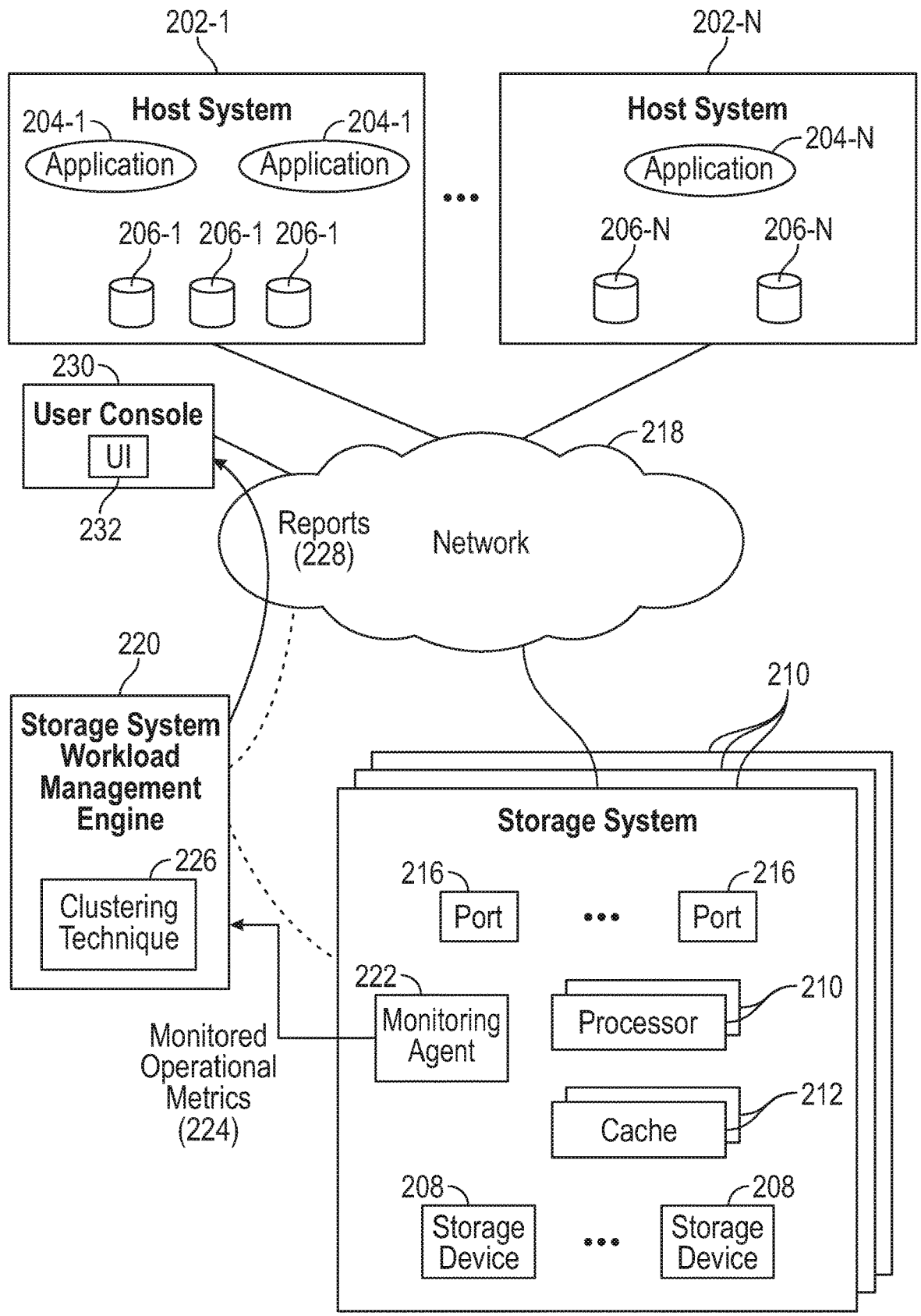
FIG. 2 is a block diagram of an arrangement that includes host systems, storage systems, and a storage system workload management engine according to some examples.

FIG. 2 is a block diagram of an example arrangement that includes a number of host systems 202-1 to 202-N, where N≥1. Although multiple host systems are depicted in FIG. 2, it is noted that in other examples, just one host system may be provided.

The host system 202-1 includes application programs 204-1 and storage volumes 206-1 that are presented to the host system 202-1. The host system 202-N includes an application program 204-N and storage volumes 206-N that are presented to the host system 202-N. Although examples according to FIG. 2 show application programs as examples of requesters that can access storage volumes, it is noted that in other examples, different types of requesters can access storage volumes.

As discussed above, the storage volumes 206-1 and 206-N are logical entities that are useable by requesters in the host systems 202-1 to 202-N. The underlying data that can be accessed using the storage volumes are stored by storage devices 208 of a storage system 210 (or multiple storage systems 210). The storage devices 208 can be implemented using disk-based storage devices, solid state memory devices, and/or other types of persistent storage devices. The storage devices 208 can be arranged as an array (or multiple arrays) of storage devices.

The storage system 210 also includes processors 212 and cache memories 214. The processors 212 can execute a data access program (in the form of machine-readable instructions) that manage access of data stored in the storage devices 208 in response to requests received from a requester based on access of a storage volume (or multiple storage volumes) by the requester. A cache memory 214 can be used to temporarily store data, such as write data to be written to the storage devices 208.

The storage system 210 further includes various ports 216. A "port" can refer to a communication interface through which for a host system 202-$i$ ($i$=1 to N) is able to access the storage system 210 over a network 218. Examples of the network 218 can include any or some combination of the following: a storage area network (SAN), a local area network (LAN), a public network such as the internet, and so forth.

Each port 216 has a corresponding bandwidth that can be used to communicate data in response to access requests from requesters. A port can refer to a physical port or a logical port.

Although not shown, the host systems 202-1 and 202-N can each also include ports for communication over the network 218.

The ports 216, the processors 210, and the cache memories 212 are examples of resources of the storage system 210 that can be used to perform tasks associated with access of storage volumes by respective requesters.

FIG. 2 also shows a storage system workload management engine 220, which can perform a storage system workload management process, such as the process 100 shown in FIG. 1.

As used here, an "engine" or can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The storage system workload management engine 220 can be part of the storage system 210, or alternatively, can be separate from the storage system 210 and coupled to the network 218. A monitoring agent 222 (implemented using hardware or a combination of hardware and machine-readable instructions) can run in the storage system 210 to collect various operational metrics of the storage system 210. The storage volumes are identified by respective unique identifiers, and I/O requests that are targeted to the storage volume are tracked by tracking entities that can execute in the host systems 202-1 to 202-N. The tracked VO requests and associated characteristics of the I/O requests (e.g., an I/O count of a number of I/O requests), a ratio of read requests to write requests, an I/O size, a rate of I/O requests, etc.) can be associated with the respective unique identifiers of the storage volumes to which the I/O requests are targeted. As a result, the monitoring agent 222 can determine operational metrics for each individual storage volume that are tracked using the unique identifiers of the storage volumes.

The monitoring agent 222 can transmit collected values of operational metrics 224 to the storage system workload management engine 220.

Figure 3:
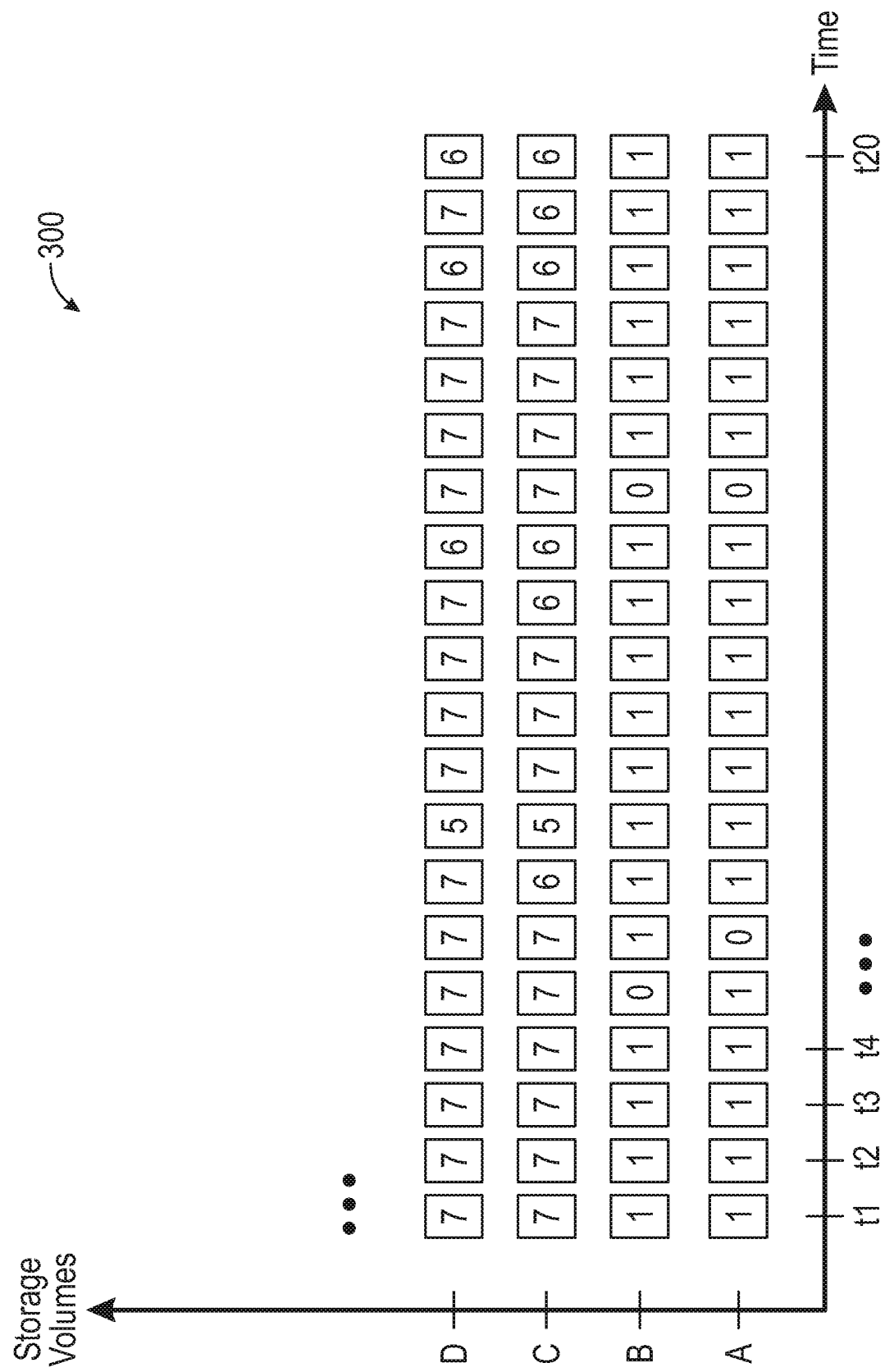
FIG. 3 is a plot of vectors of workload fingerprints for respective storage volumes, according to some examples.

FIG. 3 shows a plot 300 that can be generated by the storage system workload management engine 220. In the example plot 300, the horizontal axis represents time, and the vertical axis represents different storage volumes (storage volumes A, B, C, and D shown in FIG. 3). For each storage volume, respective workload fingerprints are assigned based on a collection of operational metrics collected at corresponding time points along the time axis.

According to FIG. 3, each row of workload fingerprints makes up a vector of workload fingerprints at multiple time points t1 to t20. Each workload fingerprint is in the form of a numeric value included in a cell (a rectangular block) of the plot 300. For example, there can be some number (e.g., 8 or some other number) of workload fingerprints, and a workload fingerprint can be selected from among the number workload fingerprints to assign to a storage volume at a given time point. The workload fingerprint selected is based on values of a collection of operational metrics at the given time point.

As the operational metrics change in values over time, the workload fingerprints assigned to a storage volume can change accordingly. For example, for storage volume A, the vector of workload fingerprints includes a sequence of "1" and "0" values. Similarly, for storage volume B, the vector of workload fingerprints includes a sequence of "1" and "0" values. For each of storage volumes C and D, the respective vector of workload fingerprints includes a sequence of "7", "6", and "5" values.

In some examples, the workload fingerprints can be created using an unsupervised machine learning technique performed across operational metrics collected from storage systems that are deployed at various sites. Alternatively, the workload fingerprints may be pre-assigned, such as by a user or another entity.

The total time interval over which the vector of workload fingerprints for each storage volume is collected can be specified by an entity, such as a user, a machine, or a program. The total time interval can be 24 hours or a different total time interval, for example.

Storage volumes can be considered similar to one another if their assigned vectors of workload fingerprints share some specified similarity with respect to one another. In some examples, the storage system workload management engine 220 can use an unsupervised machine learning technique (226 in FIG. 2) for clustering the storage volumes based on their respective vectors of workload fingerprints. For example, a density-based spatial clustering of applications with noise (DBSCAN) data clustering technique can be employed for clustering the storage volumes based on the respective vectors of workload fingerprints. Given a set of points in a space (which in this case includes vectors of workload fingerprints), the DBSCAN technique groups together the workload fingerprint vectors that are closely packed together.

In other examples, other clustering techniques can be employed, such as an affinity propagation clustering technique, or a different clustering technique.

In the example of FIG. 3, the similarity of the workload fingerprint vectors for storage volumes A and B would cause the clustering technique to group storage volumes A and B into a first cluster, and the similarity of the workload fingerprint vectors for storage volumes C and D would cause the clustering technique to group storage volumes C and D into a second cluster.

Once the clusters of storage volumes have been identified, the storage system workload management engine 220 can send various reports 228 (FIG. 2) to a user console 230 over the network 218. A user console can refer to an electronic device, such as a desktop computer, a notebook computer, a tablet computer, a smartphone, and so forth. The user console 230 can display a user interface (UI) 232, which can present information of a report from the storage system workload management engine 220 to a user of the user console 230. Although FIG. 2 shows an example in which the storage system workload management engine 220 sends reports 228 to one user console 230, in other examples, the storage system workload management engine 220 can send reports 228 to multiple user consoles.

In some examples, a report 228 can include operational metrics for the respective clusters identified by the clustering technique 226 based on workload finger vectors. An operational metric for a cluster of storage volumes can be computed by aggregating (e.g., summing, averaging, etc.) values of the operational metric for the storage volumes of the cluster.

Figure 4:
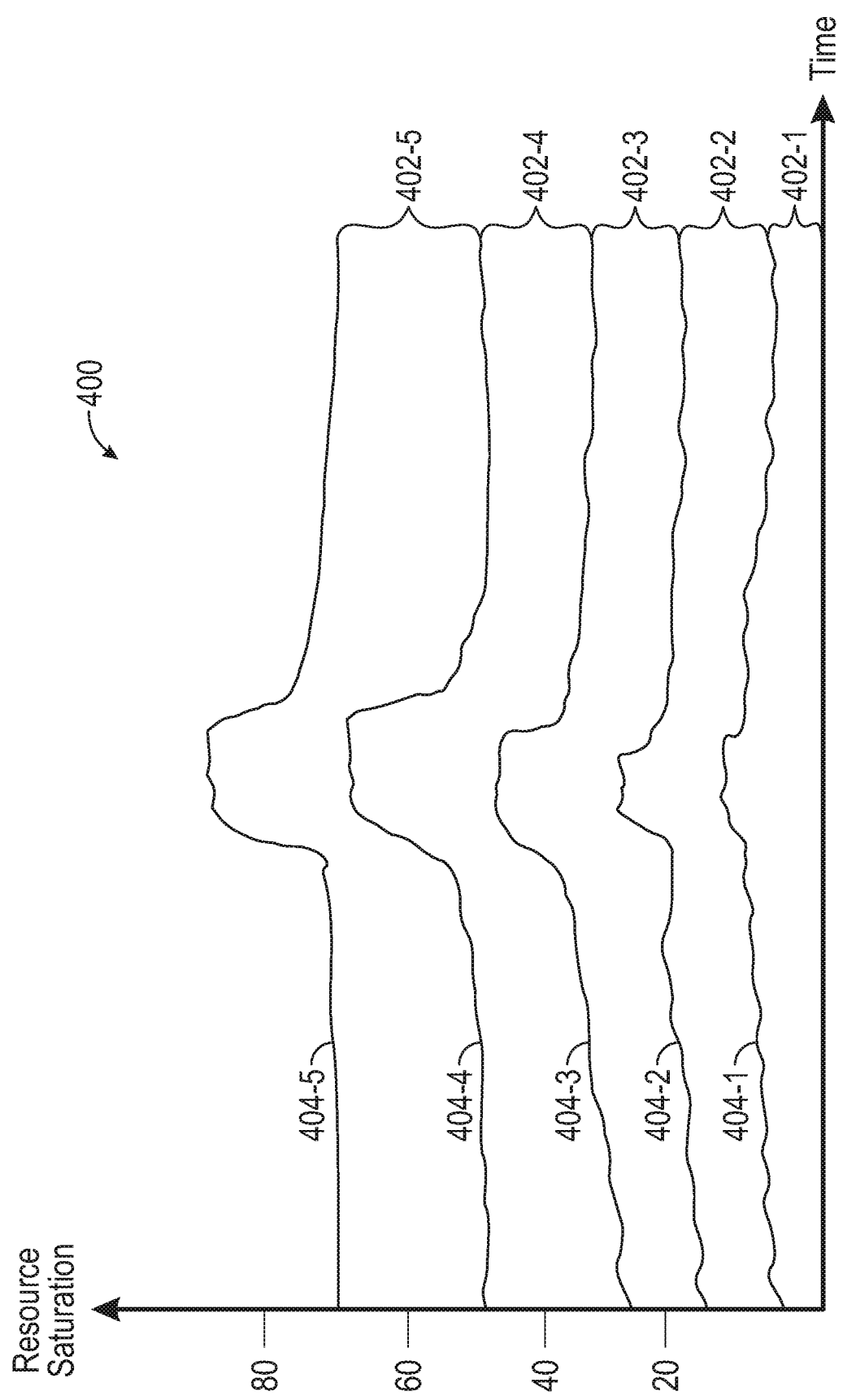
FIG. 4 is a plot of relative contributions of respective clusters of storage volume to saturation of a resource, according to some examples.

In an example, saturation of a resource (e.g., a processor, a cache memory, or a port) caused by respective clusters of storage volumes can be presented in a report, such as in the form of a plot 400 shown in FIG. 4.

Saturation of a resource refers to an amount of the resource that is consumed due to usage of the resource by a workload, which according to FIG. 4 is the workload of a given cluster of storage volumes. In an example, saturation can be represented as a percentage (e.g., 60% saturation means that 60% of the resource has been consumed, and 40% of the resource remains available). In some examples, the saturation of a resource can be computed using a machine learning model, such as the model discussed in the U.S. patent application entitled "Operational Metric Computation for Workload Type," filed concurrently herewith (U.S. patent application Ser. No. 16/861,511, now granted as U.S Pat. No. 11,249,659).

The horizontal axis of the plot 400 represents time, and the vertical axis of the plot 400 represents saturation (expressed as a percentage) of the resource. Contributions of each of the clusters of storage volumes to saturation is presented in the plot 400. For example, different graph portions 402-1, 402-2, 402-3, 402-4, and 402-5 represent respective contributions to the saturation of the resource by corresponding clusters of storage volumes. In the example of FIG. 4, it is assumed that there are five clusters of storage volumes.

A curve 404-1 that defines the graph portion 402-1 represents the contribution of a first cluster of storage volumes to the saturation of the resource. The curve 404-1 has different saturation values at different time points.

A curve 404-2 and the curve 404-1 define the graph portion 402-2. The difference between the curve 404-2 and the curve 404-1 at each time point represents the contribution of a second cluster of storage volumes to the saturation of the resource. Graph portion 402-3 is similarly defined by curves 404-3 and 404-2, graph portion 402-4 is defined by curves 404-4 and 404-3, and graph portion 402-5 is defined by curves 404-5 and 404-4.

In further examples, the storage system workload management engine 220 can identify outliers within a cluster of storage volumes. An outlier can refer to a storage volume in a given cluster that has an operational characteristic that deviates by some specified tolerance from other storage volumes of the given cluster. For example, in a cluster of storage volumes, a given storage volume may report a higher latency or service time despite running a workload profile similar to other storage volumes in the cluster of storage volumes.

Figure 5:
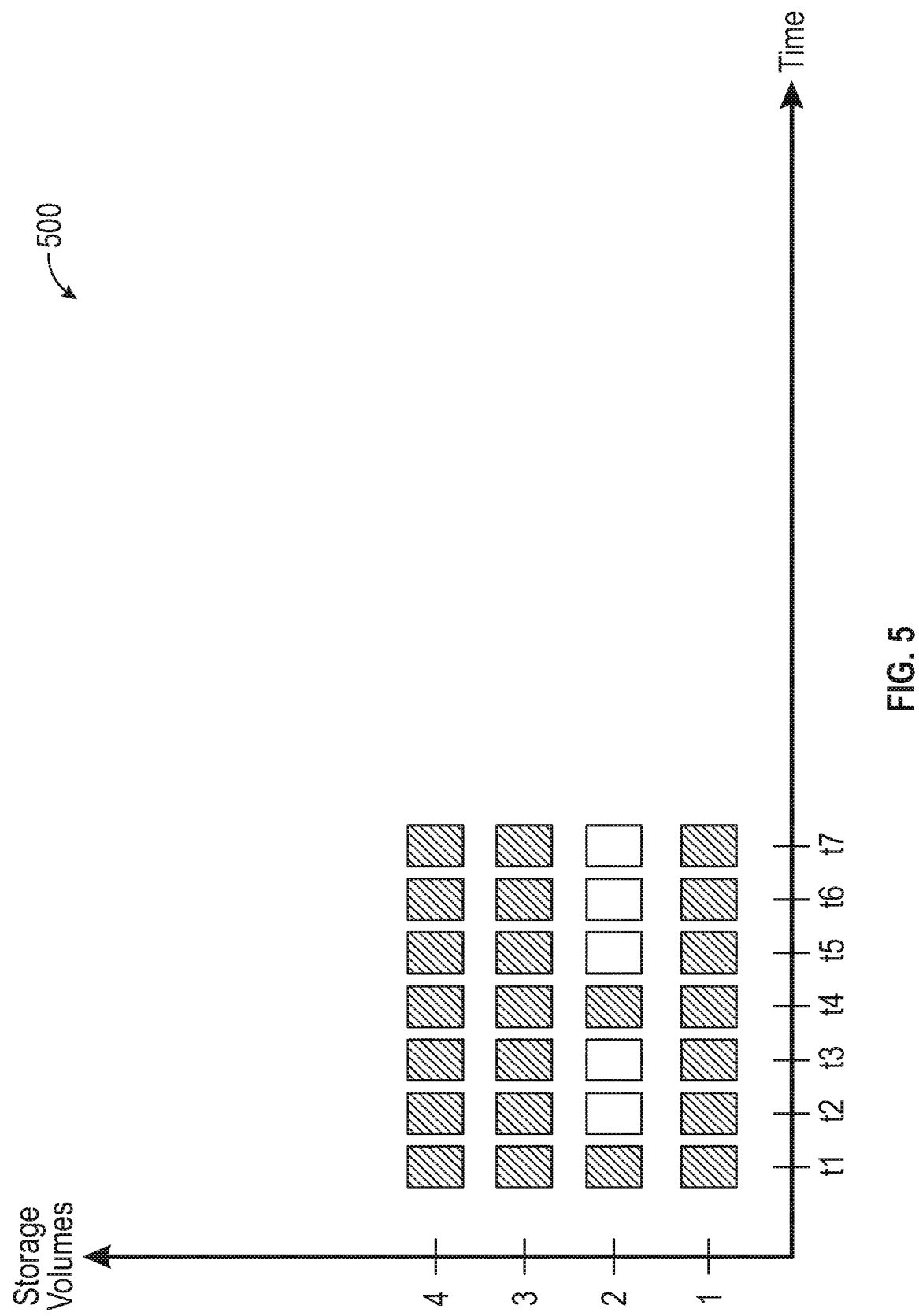
FIG. 5 is a plot of operational metrics for respective storage volumes of a cluster of storage volumes, to allow for a detection of an outlier according to some examples.

FIG. 5 shows a plot 500 in which a horizontal axis represents time, and the vertical axis represents respective storage volumes of a cluster of storage volumes. Different colors or patterns assigned to each cell in the plot 500 represents respective values of an operational metric, such as latency, service time, and so forth. In the example of FIG. 5, it can be seen that storage volume 2 has operational metric values that deviate from those of other storage volumes.

The plot 500 of FIG. 5 can be presented by the storage system workload management engine 220 as a report 228 (FIG. 2) for viewing in the UI 232 of the user console 230. Alternatively, the plot 500 (or information of the plot 500) can be analyzed by the storage system workload management engine 220 to identify an outlier storage volume(s) in the cluster.

By being able to identify outlier storage volume(s) within a cluster of storage volumes, a performance optimization technique can be applied by the storage system workload management engine 220 to specific storage volumes identified as outliers. The performance optimization technique can include, as examples, migrating data of the outlier storage volume to a different storage system or group of storage devices, allocating more resources to the outlier storage volume, and so forth.

Figure 6:
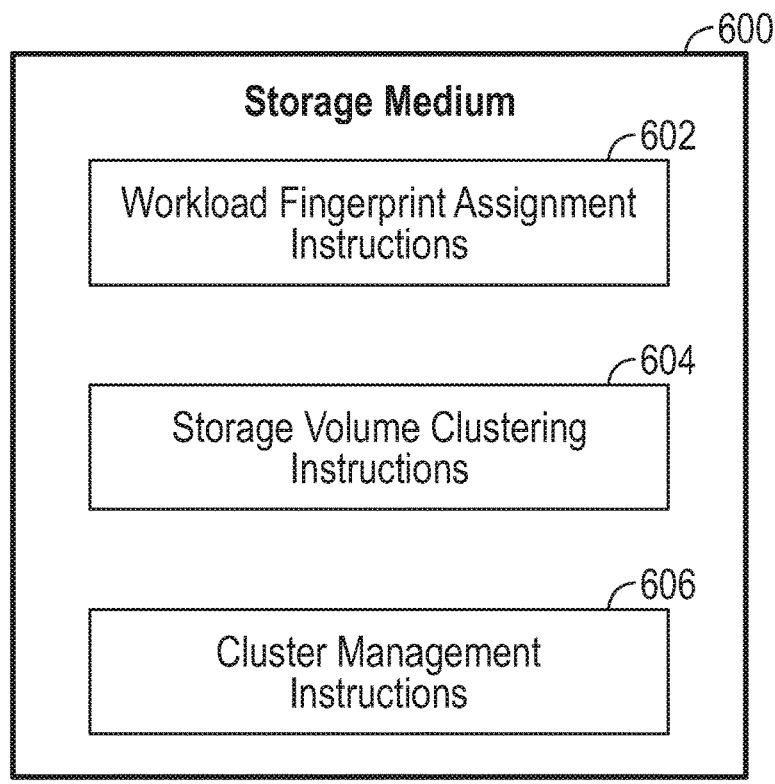
FIG. 6 is a block diagram of a storage medium storing machine-readable instructions according to some examples.

FIG. 6 is a block diagram of a non-transitory machine-readable storage medium 600 storing machine-readable instructions that upon execution cause a system (which can include the storage system workload management engine 220, for example) to perform various tasks.

The machine-readable instructions include workload fingerprint assignment instructions 602 to assign workload fingerprints to each respective storage volume of a plurality of storage volumes, the workload fingerprints assigned to the respective storage volume across a plurality of points (time points or spatial points). For example, workload fingerprint is assigned to a storage volume based on resource operational metrics associated with access of data in the storage volume.

The machine-readable instructions further include storage volume clustering instructions 604 to, based on the workload fingerprints assigned to respective storage volumes of the plurality of storage volumes, group the storage volumes into clusters of storage volumes. For example, the storage volume clustering instructions 604 can assign, using a clustering technique, a first storage volume to a first cluster based on a collection of the workload fingerprints (e.g., workload fingerprint vector) assigned to the first storage volume and respective collections of the workload fingerprints (e.g., workload fingerprint vectors) assigned to other storage volumes of the first cluster.

The machine-readable instructions further include cluster management instructions 606 to manage an individual cluster of the clusters of storage volumes according to an attribute associated with the individual cluster.

In further examples, machine-readable instructions can identify an outlier storage volume within a cluster of storage volumes, by determining that a given storage volume within the cluster of storage volumes is the outlier storage volume in response to determining that an operational metric(s) of the given storage volume deviates from the operational metric(s) of other storage volumes of the cluster.

Figure 7:
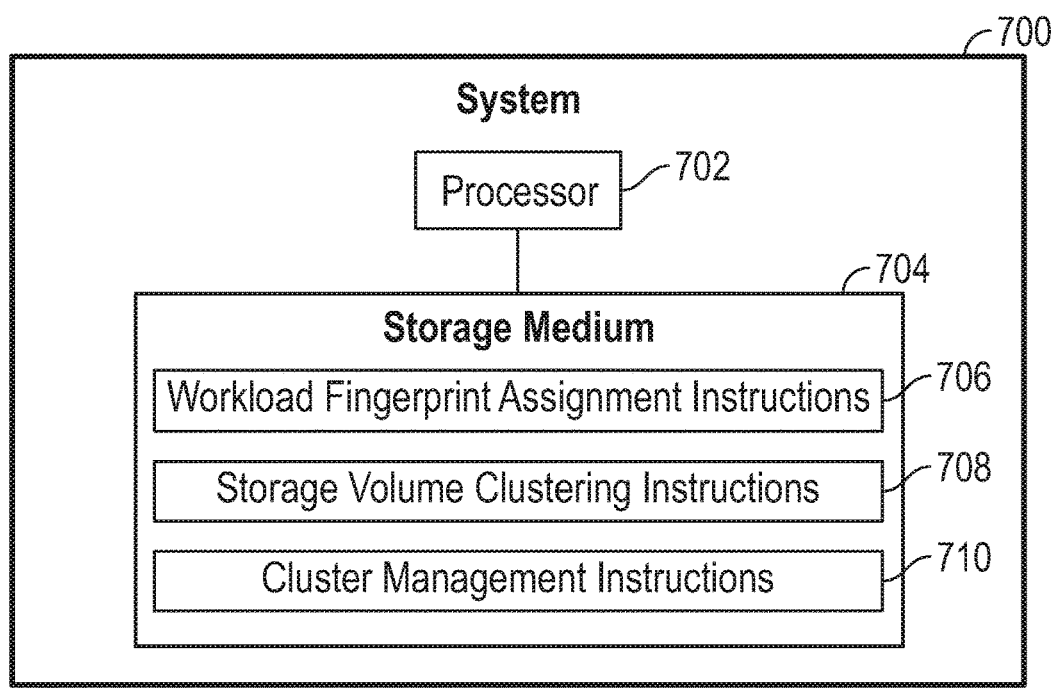
FIG. 7 is a block diagram of a system according to some examples.

FIG. 7 is a system 700 including a hardware processor 702 (or multiple hardware processors). A hardware processor can include a microprocessor, a core of a multi-core microprocessor, a microcontroller, a programmable integrated circuit, a programmable gate array, a digital signal processor, or another hardware processing circuit.

The system 700 further includes a storage medium 704 storing machine-readable instructions executable on the hardware processor 702 to perform various tasks. Machine-readable instructions executable on a hardware processor can refer to the instructions executable on a single hardware processor or the instructions executable on multiple hardware processors.

The machine-readable instructions include workload fingerprint assignment instructions 706 to assign workload fingerprints at multiple time points to each respective storage volume of a plurality of storage volumes, where a workload fingerprint assigned to a storage volume is based on resource operational metrics associated with access of data in the storage volume.

The machine-readable instructions further include storage volume clustering instructions 708 to, based on the workload fingerprints assigned to respective storage volumes of the plurality of storage volumes, group the storage volumes into clusters of storage volumes.

The machine-readable instructions further include cluster management instructions 710 to manage an individual cluster of the clusters of storage volumes according to an attribute associated with the individual cluster.

A storage medium (e.g., 600 in FIG. 6 or 704 in FIG. 7) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive operational metrics collected for operations involving a plurality of storage volumes responsive to input/output (I/O) requests;
   assign a respective vector of workload fingerprints to each respective storage volume of the plurality of storage volumes, wherein each respective vector of workload fingerprints comprises a plurality of workload fingerprints across a plurality of points assigned to a respective storage volume of the plurality of storage volumes, and wherein each workload fingerprint of the respective vector of workload fingerprints is based on values of the operational metrics collected for the operations;
   based on the respective vectors of workload fingerprints assigned to respective storage volumes of the plurality of storage volumes, group the storage volumes into clusters of storage volumes, wherein a first storage volume and a second storage volume are grouped into a first cluster of storage volumes responsive to a determination of a similarity between a first vector of workload fingerprints assigned to the first storage volume and a second vector of workload fingerprints assigned to the second storage volume, the first vector of workload fingerprints comprising different workload fingerprint values across the plurality of points, and the second vector of workload fingerprints comprising different workload fingerprint values across the plurality of points; and
   manage an individual cluster of the clusters of storage volumes according to an attribute associated with the individual cluster.

2. The non-transitory machine-readable storage medium of claim 1, wherein each respective vector of workload fingerprints comprises the plurality of workload fingerprints across a plurality of time points.

3. The non-transitory machine-readable storage medium of claim 1, wherein the instructions upon execution cause the system to:
   change, in the first vector, a workload fingerprint value at a first point of the plurality of points responsive to a change in values of the operational metrics at the first point.

4. The non-transitory machine-readable storage medium of claim 1, wherein the operational metrics comprise usage metrics relating to usage of a storage system comprising the plurality of storage volumes, and performance metrics representing how well the storage system is performing.

5. The non-transitory machine-readable storage medium of claim 1, wherein the instructions upon execution cause the system to:
   identify an outlier storage volume within the first cluster of storage volumes.

6. The non-transitory machine-readable storage medium of claim 5, wherein the instructions upon execution cause the system to:
   determine that a given storage volume within the first cluster of storage volumes is the outlier storage volume in response to determining that an operational metric of the given storage volume deviates from the operational metric of other storage volumes of the first cluster.

7. The non-transitory machine-readable storage medium of claim 6, wherein the instructions upon execution cause the system to:
   determine that the given storage volume within the first cluster of storage volumes is the outlier storage volume in response to determining that the operational metric of the given storage volume deviates from the operational metric of other storage volumes of the first cluster by greater than a specified tolerance.

8. The non-transitory machine-readable storage medium of claim 1, wherein the instructions upon execution cause the system to:
   present an output operational metric for each of the clusters of storage volumes.

9. The non-transitory machine-readable storage medium of claim 1, wherein managing the individual cluster according to the attribute associated with the individual cluster comprises configuring a quality of service setting for the individual cluster.

10. The non-transitory machine-readable storage medium of claim 1, wherein managing the individual cluster according to the attribute associated with the individual cluster comprises throttling requests for data in storage volumes of the individual cluster.

11. The non-transitory machine-readable storage medium of claim 1, wherein managing the individual cluster according to the attribute associated with the individual cluster comprises migrating data of the individual cluster of storage volumes between storage devices.

12. A system comprising:
   a processor; and
   a non-transitory storage medium storing instructions executable on the processor to:
      assign a respective vector of workload fingerprints to each respective storage volume of a plurality of storage volumes, wherein each respective vector of workload fingerprints comprises a plurality of workload fingerprints across multiple time points assigned to a respective storage volume of the plurality of storage volumes, and wherein each workload fingerprint of the respective vector of workload fingerprints is based on values of operational metrics collected for operations involving the plurality of storage volumes;

based on the respective vectors of workload fingerprints assigned to respective storage volumes of the plurality of storage volumes, group the storage volumes into clusters of storage volumes, wherein a first storage volume and a second storage volume are grouped into a first cluster of storage volumes responsive to a determination of a similarity between a first vector of workload fingerprints assigned to the first storage volume and a second vector of workload fingerprints assigned to the second storage volume, the first vector of workload fingerprints comprising different workload fingerprint values across the multiple time points, and the second vector of workload fingerprints comprising different workload fingerprint values across the multiple time points; and manage an individual cluster of the clusters of storage volumes according to an attribute associated with the individual cluster.

13. The system of claim 12, wherein the instructions are executable on the processor to:

change, in the first vector, a workload fingerprint value at a first time point of the multiple time points responsive to a change in values of the operational metrics at the first time point.

14. The system of claim 13, wherein each workload fingerprint of the first vector of workload fingerprints assigned to the first storage volume represents a type of workload exhibited by the first storage volume.

15. The system of claim 12, wherein the operational metrics comprise usage metrics relating to usage of a storage system comprising the plurality of storage volumes, and performance metrics representing how well the storage system is performing.

16. The system of claim 12, wherein the instructions are executable on the processor to:

identify a given storage volume within the first cluster of storage volumes as an outlier storage volume in response to determining that an operational metric of the given storage volume deviates from the operational metric of other storage volumes of the first cluster.

17. The system of claim 12, wherein managing the individual cluster according to the attribute associated with the individual cluster comprises configuring a quality of service setting for the individual cluster or migrating the individual cluster between different storage systems.

18. A method performed by a system comprising a hardware processor, comprising:

receiving operational metrics collected for operations involving a plurality of storage volumes responsive to input/output (I/O) requests;

assigning a respective vector of workload fingerprints to each respective storage volume of the plurality of storage volumes, wherein each respective vector of workload fingerprints comprises a plurality of workload fingerprints across multiple points assigned to a respective storage volume of the plurality of storage volumes, and wherein each workload fingerprint of the respective vector of workload fingerprints is based on values of operational metrics collected for operations involving the plurality of storage volumes;

based on respective vectors of workload fingerprints assigned to respective storage volumes of the plurality of storage volumes, grouping the storage volumes into clusters of storage volumes, wherein a first storage volume and a second storage volume are grouped into a first cluster of storage volumes responsive to a determination of a similarity between a first vector of workload fingerprints assigned to the first storage volume and a second vector of workload fingerprints assigned to the second storage volume, the first vector of workload fingerprints comprising different workload fingerprint values across the multiple points, and the second vector of workload fingerprints comprising different workload fingerprint values across the multiple points;

managing an individual cluster of the clusters of storage volumes according to an attribute associated with the individual cluster; and sending a report of respective values of an operational metric for the clusters of storage volumes.

19. The method of claim 18, comprising changing, in the first vector, a workload fingerprint value at a first point of the multiple points responsive to a change in values of the operational metrics at the first point.

20. The method of claim 18, wherein the operational metrics comprise usage metrics relating to usage of a storage system comprising the plurality of storage volumes, and performance metrics representing how well the storage system is performing.

* * * * *